Oct. 2, 1962 D. M. BOYD, JR 3,056,282
METHOD AND APPARATUS FOR MEASURING THE COMPOSITION OF A LIQUID MIXTURE
Filed Nov. 12, 1959
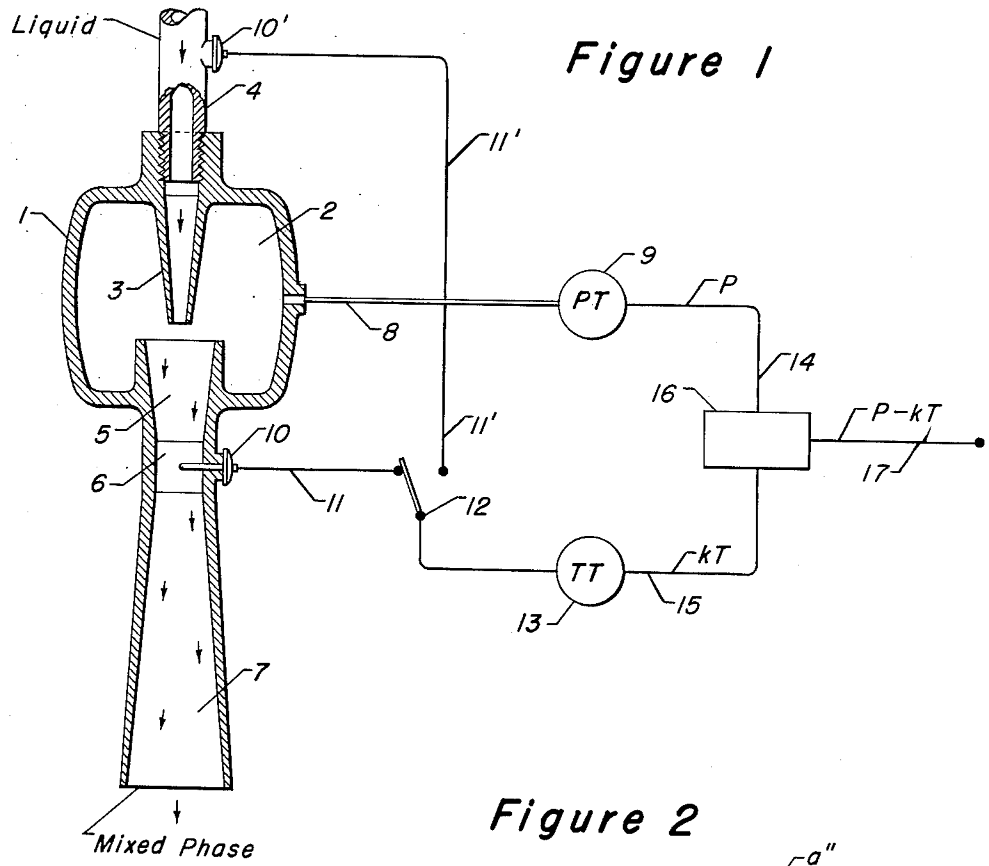
Figure 2
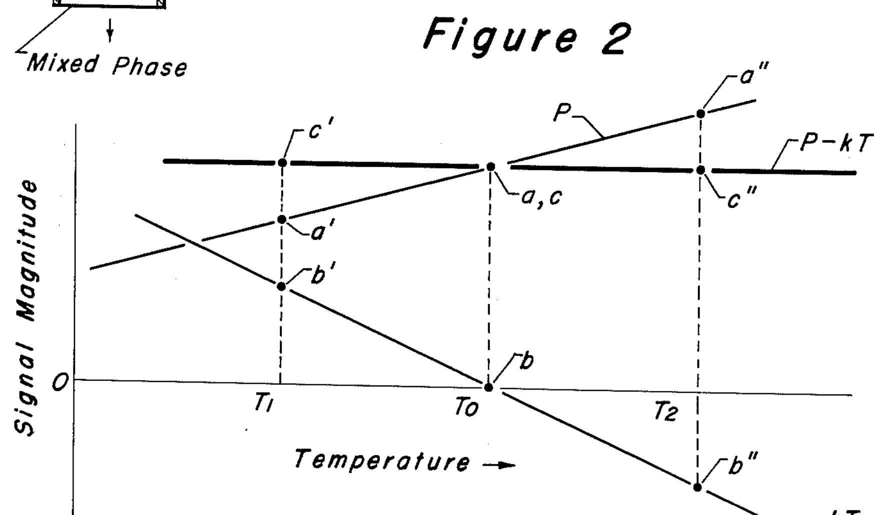
INVENTOR:
David M. Boyd Jr.
BY: Chester J. Giuliani
Philip T. Liggett
ATTORNEYS 3,056,282
Patented Oct. 2, 1962

3,056,282

METHOD AND APPARATUS FOR MEASURING THE COMPOSITION OF A LIQUID MIXTURE

David M. Boyd, Jr., Clarendon Hills, Ill., assignor to Universal Oil Products Company, Des Plaines, Ill., a corporation of Delaware Filed Nov. 12, 1959, Ser. No. 852,487
12 Claims. (Cl. 73—53)

This invention relates to the continuous measurement of liquid compositions and is specifically directed to a novel method and apparatus for producing a signal which is indicative of the composition of a liquid mixture and is useful for process control applications.

There are countless instances throughout the process industries wherein an easily measurable condition of a substance, such as temperature or pressure, is used as an indirect index of composition of the substances, which composition is often controlled in accordance with said condition. In the fractionation of a multi-component hydrocarbon mixture, for example, the measurement and control of the temperature of a fractionator overhead or bottoms, or at a selected point in the rectifying or stripping section of the column, often insures a satisfactory composition of the product with regard to the usual specifications therefor such as boiling range, endpoint, and vapor pressure; invariably the pressure of the fractionation is also controlled, one purpose therefor, among others, being to eliminate this variable as a possible source of deviation in product composition. Wherever possible, pressure and temperature measurements are preferably utilized for purposes of fractionator control, as against the more difficultly measurable properties of matter such as refractive index, ultraviolet adbsorption index, specific gravity, dielectric constant, thermal conductivity, etc., since the former variables are most easily measured and the measuring apparatus or transducers which have been developed therefor are the least expensive and the most reliable.

Frequently, however, the components of a multi-component mixture to be fractionated, particularly the key components thereof, have boiling points too close together to permit a practical correlation of temperature versus composition: That is, the temperature at a selected point within the fractionator or in the overhead or bottoms stream, as the case may be, is insensitive to the composition of the material whose temperature is being measured. To put it another way, the composition of the product or other materials which is supposed to be controlled may, in fact, be varied over wide limits with only a minute effect on the equilibrium temperature of the liquid-vapor system at the point of temperature measurement; thus, temperature is a poor and ineffectual variable to rely upon for composition control in such an application. Attempts have been made to solve the problem by increasing the sensitivity of the temperature-measuring device, employing full range spans as low as 5°–10° F. Such practice, however, accentuates the relatively small effect of uncontrolled pressure variations, for example, barometric changes or tray-to-tray pressure drop through the fractionating column, on the equilibrium temperature, and what the measuring instrument interprets as a composition change per a temperature change is often in reality merely a re-adjustment of the liquid-vapor equilibrium temperature brought about by an uncontrolled and unknown pressure change of very small magnitude. In the practical design and operation of so-called "superfractionators," that is, columns having a large number of plates and designed to separate mixtures of isomeric hydrocarbons or other closely boiling compounds, product composition is either even more indirectly controlled through adjustment of the mass and energy requirements of the column, temperature control being entirely omittted, or else, at the other extreme, is more or less directly controlled by means of a suitable automatic process stream analyzer such as a differential refractometer or vapor phase chromatograph. While these latter instruments have acquired a definite place in the field of process control, and in a few situations their use is mandatory, there remain a great number of applications which do not justify the high first cost and high maintenance expense of a process stream analyzer and yet do not lend themselves to simple temperature control for the reasons aforesaid. Since a single fractionator is capable of achieving a split between only two key components of a multi-component mixture, a quantative analysis of every compound in a mixture, as is furnished by chromatographic means, is simply expensive surplusage insofar as the utilization of such information for fractionator control purposes is concerned. There exists a need, then, for a simple, relatively inexpensive, and reliable means for measuring the composition of a liquid mixture such as may be derived from a product stream of a fractionating column, and translating this information into a signal suitable for control purposes; and it is with fulfilling this need that the present invention herein is concerned.

It is, therefore, a principal object of this invention to provide a relatively simple and inexpensive method and means for producing a signal which is analogous to, or indicative of, the composition of a liquid mixture.

Another object of the present invention is to provide a liquid composition-measuring apparatus which is able to furnish a composition signal continuously without interruption.

It is another object of this invention to provide a liquid composition-measuring apparatus which requires a very small amount of liquid sample and therefore involves a negligible sampling delay time.

A further object of this invention is to furnish a liquid composition-measuring apparatus having a high speed of response with respect to composition change versus output signal change.

A still further object of this invention is to provide a method and apparatus for measuring the Reid vapor pressure of a motor fuel.

These and other objectives and advantages of the present invention will be apparent from the accompanying disclosure and drawing.

One embodiment of this invention relates to a liquid composition-measuring apparatus comprising in combination an enclosed chamber having a liquid inlet conduit terminating in a restricted opening within said chamber, an outlet conduit having an open upstream end of larger cross-section than said restricted opening communicating with the interior of said chamber, said outlet conduit being substantially in axial alignment with and spaced from said restricted opening, an absolute pressure transducer connected to said chamber and a temperature transducer connected to one of said inlet and outlet conduits whereby said transducers measure the variables of absolute pressure and temperature respectively, and each of said transducers producing signals which are combined to produce a resulting composite signal which in turn provides a measure of liquid composition.

Another embodiment of the present invention concerns a method of measuring the composition of a liquid mixture which comprises passing a jet of the liquid into and through a confined pressure-measuring zone in open communication therewith, the velocity of said jet being sufficiently high as to reduce the pressure existing in said zone to the equilibrium vapor pressure of said liquid at the flowing temperature thereof, producing a pressure signal and a temperature signal responsive respectively to the variables of absolute pressure within said zone and temperature of said liquid, and combining said signals to yield a composite signal which in turn provides a measure of liquid composition.

In a more specific embodiment, the present invention herein provides a method of measuring the composition of a liquid mixture which comprises passing a jet of the liquid into and through a confined pressure-measuring zone in open communication therewith whereby the pressure in said zone is reduced, adjusting the velocity of said jet to at least a value sufficiently high such that said pressure is substantially independent of said velocity, producing a pressure signal P and a temperature signal $kT$ directly responsive respectively to the variables of absolute pressure within said zone and temperature of said liquid, $k$ being a constant, and subtracting the temperature signal from the pressure signal to yield a temperature-biased pressure signal whose magnitude is a linear function of $P-kT$ and which provides a measure of liquid composition.

In essence, the apparatus of this invention comprises a modified jet pump operated as an ejector, an absolute pressure transducer, and a temperature transducer, all of the above elements being appropriately interconnected as hereinafter described. As is well known to those skilled in the art of fluid transport, a conventional ejector uses a high velocity jet of motive fluid, either liquid or gas, to entrain and convey a slowly moving or stagnant fluid, also either liquid or gas, from a zone of low pressure to a zone of higher pressure intermediate between the supply pressure of the motive fluid and the suction pressure. The modified ejector of this invention is employed not as a pump but as a constant volume, continuous vaporizer of the liquid whose composition is to be measured, and therefore there is no external "entrained" fluid involved, the only entrained fluid being the vaporized portion of the liquid sample itself, and the liquid sample serving as the "motive" fluid. The operability of the instant invention resides in the fact that an ejector can, at the most, produce a vacuum or zone of reduced pressure no lower than the vapor pressure of the motive fluid at the temperature thereof. In operation, a jet of liquid is passed through a confined pressure-measuring zone and the pressure within the zone begins to drop as the jet tends to pull a vacuum therein; at the same time, a portion of the liquid vaporizes, causing the pressure-measuring zone to become filled with vapor. When the pressure decreases to the equilibrium vapor pressure of the liquid at its flowing temperature, no further reduction in pressure can be effected since liquid-vapor equilibrium now obtains. The velocity of the jet must be at least high enough to assure attainment of the equilibrium vapor pressure, which velocity is a function of the volume of the pressure-measuring zone, the nature of the liquid, the flowing temperature, and the discharge pressure of the mixed phase stream of liquid and vapor leaving the pressure-measuring zone. Under this condition, the equilibrium vapor pressure is substantially independent of the velocity of the jet, further velocity increases having no effect on the pressure. When a binary liquid mixture is charged to the ejector whereupon it is partially vaporized so that a two-phase constant volume system obtains, the temperature and the pressure of the system together rigorously define the composition of the original liquid. Where a ternary or other multi-component mixture is similarly charged, the temperature and pressure approximately define the relative proportions of two key components thereof, the approximation approaching exactness when the remaining components are present in a constant or minor proportion; liquid mixtures of this latter character constitute the majority of product streams of commercial fractionation, extraction, and other separation processes as well as a number of hydrocarbon conversion processes. The equilibrium temperature and pressure are simultaneously measured and converted to appropriate signals by means of said pressure and temperature transducers, and the resulting temperature and pressure signals are then algebraically combined in any one of many, although not necessarily equivalent, ways to yield a composite signal characterizing the composition of the unknown liquid mixture.

Since the vapor pressure of a liquid increases with temperature, the respective signals are combined in opposing relationship to effect a bilateral compensation of one signal by the other, so that the composite signal either increases with pressure and decreases with temperature or decreases with pressure and increases with temperature. Either or both of the signals may be amplified or attenuated, as a particular application warrants, so that for a fixed liquid composition the composite signal remains constant regardless of the vaporization temperature, and any change which does occur in the composite signal may then be uniquely related to a composition change. For example, an increase in vapor pressure which is not accompanied by at least an equivalent increase in temperature means that the concentration of a lower boiling component in the liquid sample has increased; conversely, an increase in temperature unaccompanied by at least an equivalent increase in vapor pressure means that the concentration of a higher boiling component in the liquid sample has increased.

The structure and operation of the invention, including the several embodiments thereof, may be more fully described with reference to the accompanying drawing of which FIGURE 1 illustrates one manner in which the various elements are connected and FIGURE 2 represents a typical constant composition response curve for a calibrated apparatus.

As shown in FIGURE 1, the ejector or vaporizing means comprises an enclosed chamber 1 which is provided with a liquid inlet conduit 4 terminating within chamber 1 in a restricted opening 3. The restricted opening may be simply a small hole or sharp-edged orifice, a convergent nozzle as illustrated, or a convergent-divergent nozzle; nozzle means is generally preferred since a more efficient pressure-to-velocity conversion is obtainable thereby. Spaced from opening 3 and in axial alignment therewith is a discharge conduit having an open upstream end of larger cross-section comprising a convergent section 5, a straight section 6, and a divergent section 7, which sections together from a convergent-divergent nozzle. In another embodiment of the invention, the outlet conduit may be merely a straight conduit, and in still another embodiment it may be exclusively a divergent nozzle as defined by member 7 of FIGURE 1.

In operation, the liquid sample is charged from a zone of high pressure, as with a pump, through conduit 4 and opening 3 to form a high velocity jet passing through space 2 within chamber 1. The action of the jet reduces the pressure within space 2 to the equilibrium vapor pressure of the liquid, as hereinabove described. A portion of the jet continually vaporizes so that space 2 is filled with equilibrium vapor, excess vapor being entrained with the unvaporized portion of the jet, and the resulting mixed phase stream being discharged through the outlet conduit comprising sections 5, 6 and 7 into a suitable disposal facility such as a sump or sewer, or else being returned to the process from which the liquid sample is withdrawn. The ultimate discharge pressure downstream of member 7 may be less or greater than the pressure within zone 2, as desired.

An absolute pressure transducer 9 is connected to chamber 1 via pressure tap 8, and a temperature transducer 13 is connected through switch 12 alternatively to either of two temperature sensing elements 10 and 10' via lines 11 and 11' respectively. Temperature sensing element 10 is placed in straight section 6 of the outlet conduit or at any other portion thereof as desired, and temperature sensing element 10' is placed in liquid inlet conduit 4. In practice, either of the two temperature sensing elements may be employed, depending upon whether the final calibration of the apparatus is to be based on liquid inlet temperature or on the temperature of the mixed phase stream, the latter generally being somewhat lower than the inlet temperature due to absorption of heat of vaporization. While it is possible, as a third alternative, to sense the temperature in pressure-measuring zone 2, such an arrangement is not practical because the relative quiescence of this zone would result in extremely poor heat transfer between vapor and the temperature sensing element, thereby slowing down the speed of response and making possible the existence of large dynamic errors. With regard to the transducers themselves, it is contemplated that standard, commercially available instruments will be employed, including electronic transducers that provide a voltage or current signal as well as those transducers whose output signals are pneumatic or hydraulic. Absolute pressure transducer 9 may be a single instrument containing barometric pressure compensating means integral therewith; or it may comprise two pressure transducers, one measuring the pressure of zone 2 and the other measuring atmospheric pressure, the output signals of both being combined to yield a signal responsive exclusively to the absolute pressure within zone 2. Whatever the means employed, it is essential to the invention to measure the absolute pressure within space 2, because of the great significance of small pressure changes in reflecting liquid composition changes. For the purpose of this invention, and as appearing in the appended claims, the term "temperature transducers" is intended to include not only the signal-producing apparatus or circuitry itself but also the temperature-sensing means 10 or 10'; such temperature sensing means may be any of those conventionally employed such as a thermocouple, resistance thermometer, bi-metallic strip, or gas, liquid or vapor-filled bulbs.

In the embodiment of the invention herein illustrated, a pressure signal P and a temperature signal $k$T are transmitted via lines 14 and 15 respectively to biasing means 16. Where transducers 9 and 13 are pneumatic, biasing means 16 may be a computing relay adapted to add, subtract or ratio the signals appearing on lines 14 and 15. Suitable pneumatic computing relays, for example, are the Moore "Nullmatic M/F" relays manufactured by Moore Products Company. Where the transducers are electronic, biasing means 16 may be omitted, and lines 14 and 15 (each of which physically comprises a two-conductor cable) are then serially connected with proper regard to signal polarity or phase so that one signal opposes the other. If desired, signal amplifying or attenuating means may be connected between either or both transducers and biasing means 16 to provide additional flexibility in calibrating the apparatus. Pressure signal P is, in this embodiment, directly and positively proportional to the absolute pressure of zone 2, that is, the signal magnitude increases linearly with increasing pressure. Temperature signal $k$T is also directly and positively proportional to the flowing temperature, multiplier $k$ being a constant greater or less than unity; $k$ may be varied by adjusting the span of transducer 13 or by varying the gain of a suitable output amplifier. Biasing means 16 then subtracts the temperature signal from the pressure signal to yield a temperature-biased pressure signal on line 17 which has a magnitude of, or is proportional to, $P-kT$. Various other methods of combining the temperature and pressure signals will be discussed below. The composite signal of line 17 may then be fed to a conventional controller which acts to influence the composition of the liquid at the point of the process from which the liquid sample is withdrawn.

The apparatus is initially calibrated with a representative sample of constant composition. Over a restricted temperature range and under the constant vaporization which obtains in the ejector, the slope of the vapor pressure curve for any liquid, $dP/dT$, is substantially constant. The temperature range over which the constant slope prevails is in all cases considerably greater than the normal temperature deviations encountered in a controlled, continuous process. Multiplier $k$ is made equal or proportional to $dP/dT$ such that composite signal $P-kT$ is constant over the desired temperature range when charging a liquid of fixed composition to the ejector. This relation is illustrated in the graph of FIGURE 2 wherein signal magnitude is plotted as a function of the temperature of a liquid sample of constant composition. At the calibration temperature $T_0$, the temperature signal $-k$T contributes a strength of $b=0$, pressure signal P contributes strength of $a$, and the sum of the two results in a composite signal having a magnitude of $c$. If the temperature is decreased to $T_1$, temperature signal $-k$T increases to $b'$, pressure signal P decreases to $a'$, and the resulting composite signal has a magnitude of $c'$. If, on the other hand, the temperature is increased to $T_2$, temperature signal $-k$T decreases to $-b''$, pressure signal P increases to $a''$, and the resulting composite signal now has a magnitude of $c''$. Through proper adjustment of $k$, it is easy to make $c=c'=c''$, that is, $P-kT$ is made independent of temperature. If, now a liquid of unknown composition is charged to the ejector, any change in the magnitude of $P-kT$ is uniquely related to composition change.

While the foregoing describes the linear compensation of a pressure signal with a temperature signal, it will be apparent to those skilled in the art, and the scope of the present invention so includes, that non-linear compensation may also be employed when desired; in other words, $k$ may be caused to be a function of temperature, as by a nonlinear transducer or amplifier, such that temperature compensation may be obtained over a considerably wider range than is possible by linear means. The cost of the elaborate apparatus to achieve non-linear compensation, however, is usually not justified, particularly since the present invention is preferably utilized in a closed control loop, or at least is associated with a temperature-controlled process, and the temperature variations encountered thereby lie well within the range in which linear compensation is valid.

The temperature-biased pressure signal is particularly useful in the supervisory control of a gasoline-producing refinery unit since such signal is proportional to, and may readily be made equal to, the Reid vapor pressure of a motor fuel, which has long been utilized by refinery personnel in obtaining a rapid evaluation of the quality of the gasoline product. In measuring a Reid vapor pressure, a fixed volume of gasoline at 32° F. is added to a fixed volume of water-saturated air at 100° F. and the whole is intimately mixed and brought to 100° F.; the pressure of the mixture is measured and corrected for the partial pressure of air and water and the corrected pressure is the Reid vapor pressure. The present invention achieves constant volume vaporization and obviates the need for precise temperature control by compensating out the effect of variable temperature of sample and/or vapor. Since air is not present in pressure-measuring zone 2, no further correction is necessary; and, by appropriately calibrating the spans of the temperature and pressure transducers, the magnitude of the resulting composite signal may be made equal to the Reid vapor pressure of the gasoline sample.

In another embodiment of the invention, the order of subtraction of the signals may be reversed, that is, the pressure signal is subtracted from the temperature signal to yield a pressure-biased temperature signal which is also characteristic of the liquid composition. In this case, multiplier $k$ is associated with pressure signal P instead of temperature signal T, $k$ being equal or proportional to the inverse slope of the vapor pressure curve, dT/dP. Multiplier $k$ may be readily varied by adjusting the span of absolute pressure transducer 9 or the gain of a suitable output amplifier. The resulting output signal of line 17 is then equal to, or is a linear function of, $T-kP$.

In still another embodiment of the invention, either of the pressure and temperature signals may be caused to be negatively proportional to the respective variable instead of positively proportional, which effect is readily accomplished by reversing the conventionally direct action of transducer 9 or 13. For example, by reversing the action of temperature transducer 13 and multiplying the resultant reversed temperature signal by $k$, a temperature signal $-k$T is produced which is negatively proportional to the actual temperature of the liquid, i.e., temperature signal $-k$T decreases linearly as T increases, and conversely. An adding relay, instead of a subtracting relay, is provided for biasing means 16, and pressure signal P is added to temperature signal $-k$T to yield a temperature-biased pressure signal whose magnitude is equal to, or is a linear function of, $P-kT$. In a similar manner, by reversing instead the action of pressure transducer 9, and multiplying the resultant reversed pressure signal by $k$, a pressure signal $-k$P is produced which is negatively proportional to the absolute pressure within pressure-measuring zone 2; temperature signal T is then added to pressure signal $-k$P to yield a pressure-biased temperature signal whose magnitude is equal to, or is a linear function of, $T-kP$.

In yet another embodiment of the invention, both the pressure and temperature signals are caused to be positively proportional to, or negatively proportional to, their respective variables. A dividing relay is provided for biasing means 16 whereby one signal is divided by the other to yield a composite signal which is a linear function of T/P or P/T, and which is also indicative of the liquid composition.

It is understood that the composite signal appearing on line 17 of FIGURE 1 may be further amplified or attenuated, or a constant bias may be added thereto or subtracted therefrom, as desired, to aid in the calibration of the apparatus or to render the composite signal compatible with the input requirements of the controller or other receiving means to which line 17 may be connected.

Although the present apparatus has thus far been discussed with reference to the generation of an analog signal, it is not intended that the essential features thereof be restricted to analog systems. Indeed, a very wide application of this invention lies in the field of digital control and particularly in the large scale digital computer control of refinery process units and even of entire plants. Where the compositions of hundreds of feed and product streams are to be monitored and/or controlled by a central supervisory computer, it is apparent that the use of the relatively inexpensive apparatus of this invention to accomplish such measurement will effect large savings in cost and maintenance as against the use of complex stream analyzers, which in many cases provide more information than can be profitably utilized. In adapting the instant apparatus to a digital system, the analog outputs of transducers 9 and 13 of FIGURE 1 may be fed to an analog-to-digital converter and converted to digital information which is then algebraically combined by an intermediate or supervisory computer in the manner aforesaid to arrive at the desired composite signal representative of liquid composition. From a practical standpoint, multiplexing circuitry may be provided whereby one or two analog-to-digital converters are time-shared as among the many analog and temperature signals produced by a plurality of composition-measuring means. Alternatively, the computation may be performed on an analog basis, as heretofore described, and the composite signal of line 17 of FIGURE 1 may then be sent to the analog-to-digital converter. The digital information thus produced may not only be employed for process control purposes but also may be sent, concurrently or alternatively, to data-logging facilities for use in inventory control and plant material balance computations.

While it is essential to the operation of the invention that liquid phase be charged to the ejector, the region of the process from which the liquid sample is withdrawn may contain either the liquid or the gaseous phase. With reference to a specific application of the invention, for example, the control of a butane-isobutane splitter column, the percent butane retention in the overhead vapor stream is conveniently controlled by varying the external reflux rate to the rectifying section of the column. A continuous sample stream of vapor is withdrawn from the vapor space above a deck intermediate the feed inlet and overhead vapor outlet points. The vapor is passed through a small condenser, therein condensed to liquid, and the liquid is pressured into and through the ejector of the instant invention. The mixed phase sample stream leaving the ejector may be discarded or pressured into a portion of the fractionator system which is maintained at a lower pressure than the ejector inlet pressure, as, for example, the overhead receiver. The composite signal produced by the composition-measuring apparatus, which may be either a temperature-biased pressure signal or a pressure-biased temperature signal, is transmitted to a conventional controller which in turn varies the external reflux rate in response thereto. When desired, a liquid sample may instead be withdrawn from the liquid phase hold-up on the deck, in which case the sample condenser may be omitted.

Another useful application of the invention relates to the countercurrent glycol extraction of aromatics from a mixture of aromatics and paraffins. Typically, such a separation is effected by passing feed into the intermediate portion of a multiple plate extraction column, introducing glycol solvent into the upper portion of the column and flowing it downwardly and countercurrently to the feed, withdrawing aromatic-lean raffinate as the overhead stream and withdrawing aromatic-rich solvent as the column bottoms stream. In order to prevent carry-over of heavy paraffins into the bottoms stream, a light paraffin reflux stream is introduced into the extraction column at a point intermediate the feed inlet and bottoms withdrawal points. Heretofore, it has not been practical to determine the minimum quantity of light paraffin reflux required, and it has been customary to arbitrarily assign a quantity known to be in excess of the unknown minimum and to control the reflux at this level, a practice which uneconomically increases the size and cost of raffinate fractionation facilities from which the light paraffin reflux is obtained and to which it is ultimately returned. The present invention, however, provides a simple means by which the quantity of light parafin reflux may be controlled at its optimum level. This may be accomplished by supplying the composition-measuring apparatus with a liquid sample which is withdrawn from the hydrocarbon phase at a selected plate within the reflux zone of the extraction column, and controlling the reflux rate in response to the composite signal produced thereby.

I claim as my invention:

1. Liquid composition-measuring apparatus comprising in combination an enclosed chamber having a liquid inlet conduit terminating in a restricted opening within said chamber, an outlet conduit having an open upstream end of larger cross-section than said restricted opening communicating with the interior of said chamber, said outlet conduit being substantially in axial alignment with and spaced from said restricted opening, an absolute pressure transducer connected to said chamber and transmitting a pressure signal, a temperature transducer connected to one of said conduits and transmitting a temperature signal, and signal combining means receiving and combining said temperature and pressure signals to yield a resulting output signal which in turn provides a measure of liquid composition.

2. The apparatus of claim 1 further characterized in that said temperature transducer is connected to said liquid inlet conduit.

3. The apparatus of claim 1 further characterized in that said temperature transducer is connected to said outlet conduit.

4. The apparatus of claim 1 further characterized in that said restricted opening comprises a convergent nozzle.

5. The apparatus of claim 1 further characterized in that said outlet conduit comprises a divergent nozzle.

6. The apparatus of claim 1 further characterized in that said outlet conduit comprises a convergent-divergent nozzle.

7. The method of detecting changes in composition of a liquid mixture which comprises passing a jet of the liquid into and through a confined pressure-measuring zone in open communication therewith, the velocity of said jet being sufficiently high as to reduce the pressure existing in said zone to the equilibrium vapor pressure of said liquid at the flowing temperature thereof, producing a pressure signal and a temperature signal responsive respectively to the variables of absolute pressure within said zone and temperature of said liquid, and combining said signals to yield a composite signal which in turn provides a measure of liquid composition.

8. The method of detecting changes in composition of a liquid mixture which comprises passing a jet of the liquid into and through a confined pressure-measuring zone in open communication therewith whereby the pressure in said zone is reduced, adjusting the velocity of said jet to at least a value sufficiently high such that said pressure is substantially independent of said velocity, producing a pressure signal and a temperature signal responsive respectively to the variables of absolute pressure within said zone and temperature of said liquid, and combining said signals to yield a composite signal which in turn provides a measure of liquid composition.

9. The method of detecting changes in composition of a liquid mixture which comprises withdrawing the liquid from a high pressure zone, forming a jet of said withdrawn liquid, passing said jet into and through a confined low pressure zone maintained in open communication with said jet whereby a portion of the liquid is vaporized and the pressure in said zone is reduced, adjusting the velocity of said jet to at least a value sufficiently high such that said pressure is substantially independent of said velocity, discharging the resultant mixed phase stream comprising the vaporized and unvaporized portions of said jet from said low pressure zone, producing a pressure signal and a temperature signal responsive respectively to the variables of absolute pressure within said low pressure zone and temperature of said liquid, and combining said signals to yield a composite signal which in turn provides a measure of liquid composition.

10. The method of claim 9 further characterized in that the temperature of said liquid is measured in said high pressure zone.

11. The method of claim 9 further characterized in that the temperature of said liquid is measured at a point in said mixed phase stream.

12. The method of detecting changes in composition of a liquid mixture which comprises passing a jet of the liquid into and through a confined pressure-measuring zone in open communication therewith whereby the pressure in said zone is reduced, adjusting the velocity of said jet to at least a value sufficiently high such that said pressure is substantially independent of said velocity, producing a pressure signal and a temperature signal directly responsive respectively to the variables of absolute pressure within said zone and temperature of said liquid, subtracting one of said signals from the other to yield a composite signal which varies positively as one of said variables and negatively as the other, said composite signal providing a measure of liquid composition.

References Cited in the file of this patent

UNITED STATES PATENTS

| | | |
|---|---|---|
| 2,310,415 | Frymoyer | Feb. 9, 1943 |
| 2,705,420 | Bryan et al. | Apr. 5, 1955 |
| 2,719,425 | Kalle | Oct. 4, 1955 |
| 2,866,339 | Rhodes et al. | Dec. 30, 1958 |